United States Patent [19]

Shimizu et al.

[11] 4,329,099
[45] * May 11, 1982

[54] SELF-DRILLING AND SELF-EXTRUDING FASTENER

[75] Inventors: Mituo Shimizu; Hidenori Miyake, both of Kyoto, Japan

[73] Assignee: Kabushiki Kaisha Yamashina Seikosho, Kyoto, Japan

[*] Notice: The portion of the term of this patent subsequent to Dec. 30, 1997, has been disclaimed.

[21] Appl. No.: 113,049

[22] Filed: Jan. 17, 1980

Related U.S. Application Data

[63] Continuation-in-part of Ser. No. 14,919, Feb. 26, 1979, Pat. No. 4,241,638, which is a continuation of Ser. No. 806,450, Jun. 14, 1977, abandoned.

[30] Foreign Application Priority Data

Feb. 23, 1977 [JP] Japan ............................ 52-18048

[51] Int. Cl.³ ........................................... F16B 25/00
[52] U.S. Cl. ................................................. 411/412
[58] Field of Search ............... 411/412, 413, 411, 394, 411/378; 10/10 R

[56] References Cited

U.S. PATENT DOCUMENTS

| | | | |
|---|---|---|---|
| Re. 28,111 | 8/1974 | Laverty | 411/412 |
| 408,531 | 8/1889 | Rogers | 411/412 |
| 1,749,903 | 3/1930 | Cannon | 411/413 |
| 1,802,668 | 4/1931 | Newton | 411/412 |
| 2,314,391 | 3/1943 | De Vellier | 411/411 |
| 3,277,769 | 10/1966 | Lippmeier | 411/394 |
| 3,514,918 | 11/1970 | Johnson | 411/412 |
| 3,861,269 | 1/1975 | Laverty | 411/412 |
| 3,942,405 | 3/1976 | Wagner | 411/412 X |
| 4,027,573 | 6/1977 | Laverty | 411/413 |
| 4,241,638 | 12/1980 | Shimizu et al. | 411/412 |

*Primary Examiner*—Ramon S. Britts
*Attorney, Agent, or Firm*—Alan Swabey; Robert Mitchell; Guy Houle

[57] ABSTRACT

A self-drilling and self-extruding fastener having a constant cross section stem and a tapering end portion terminating in a sharp point. The stem is provided with a pair of screw threads of like configuration. The tapering portion is provided with a third thread which begins at the pointed forward end in a very steep lead angle which functions as a drilling portion and thereafter the lead angle decreases so that the third thread may function to extrude the metal surrounding a guide opening formed by the drilling portion. Depending upon the screw thread configurations, one or both of the screw threads cooperate with the third thread to further extrude sheetmetal surrounding the guide opening into a cylindrical bore, after which the screw threads self-tap into the wall of the cylindrical bore of the projection and thereby firmly grip the sheetmetal.

9 Claims, 10 Drawing Figures

U.S. Patent  May 11, 1982  Sheet 1 of 4  4,329,099
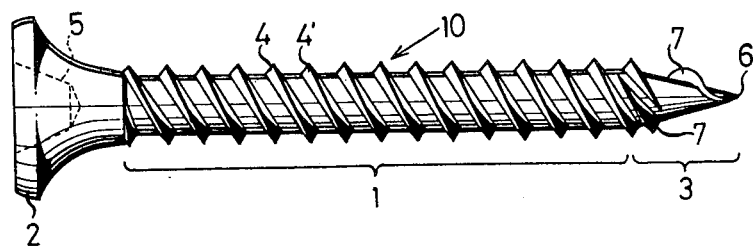
FIG.1
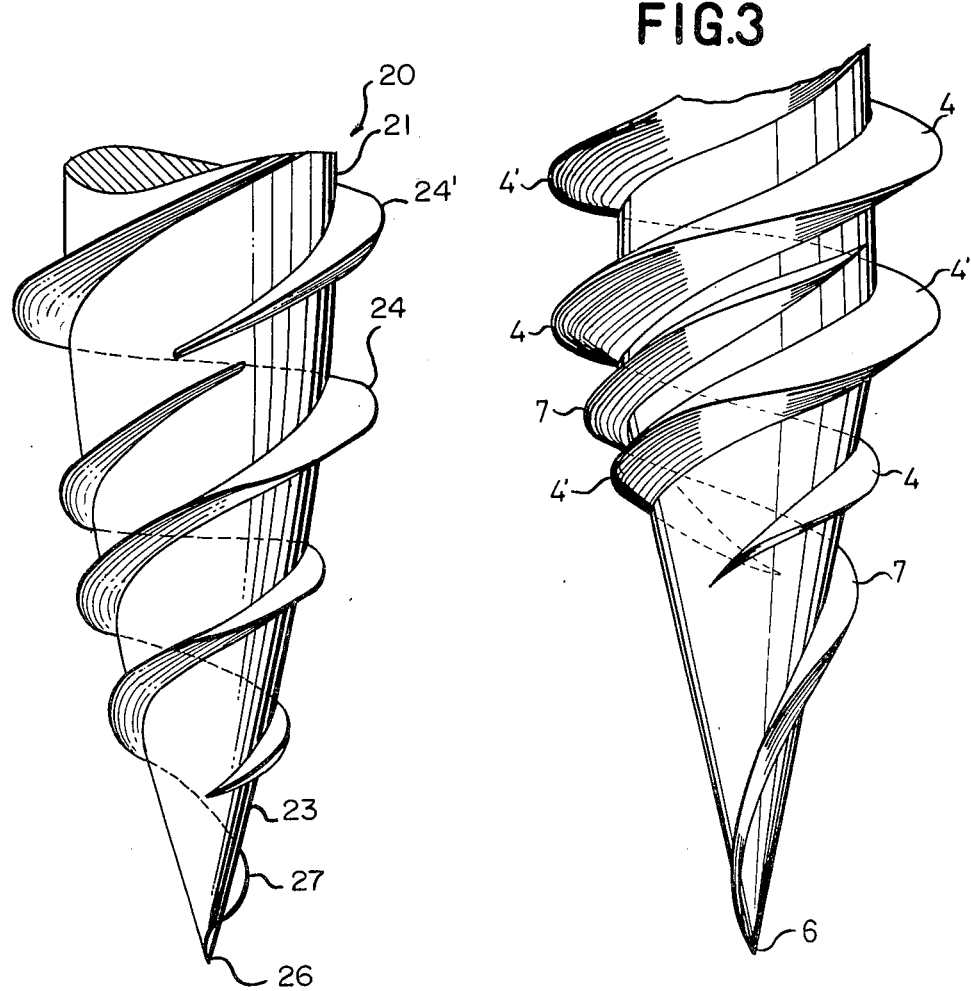
FIG.10
FIG.3

SELF-DRILLING AND SELF-EXTRUDING FASTENER

This application is a continuation-in-part of our co-pending U.S. application Ser. No. 14,919 filed Feb. 26, 1979, now U.S. Pat. No. 4,241,638, which is a continuation of Ser. No. 806,450 filed June 14, 1977, now abandoned.

This invention relates to self-drilling and self-extruding fasteners of the type including a head provided with means for engaging a rotary tool, a main body formed on its outer surface with two screw threads of the same outside diameter, a root diameter and pitch, and a tapering portion disposed remote from the head with respect to the main body and terminating in a sharp pointed forward end.

Self-extruding fasteners of this general type have particular utility in fastening two members together, i.e. in securing a member, such as a plasterboard sheet, to another member in the form of a thin sheet of metal, including a metal stud used as a framework for producing a wall or a ceiling. Generally, self-extruding fasteners used for this purpose are required to be able to perform the following functions in an instant in a single operation:

(1) forming a guide opening in a thin sheet of metal which is one member to which another member is to be fastened;

(2) extruding forwardly the material of the thin sheet of metal so as to enlarge the guide opening into a cylindrical bore formed in a projection;

(3) forming an internally threaded portion on the wall of the cylindrical bore thus formed by the extruding of the metal; and (4) clamping the member to be secured to the thin sheet of metal and holding the same in place.

This invention has as its object the provision of a self-extruding fastener of the type including a head, a main body and a tapering portion, wherein screw threads of a shape best serving the purpose of performing the aforesaid four different functions are formed on its outer surface. Further, and most particularly, the object of the invention is to provide on the tip of the fastener a thread which initially functions as a drilling thread and then as it enters into the metal functions to initiate extruding of the metal.

The aforementioned object of the invention is accomplished by forming on the fastener two screw threads which essentially extend only on the main body, such screw threads having a height which is gradually reduced in a portion where the main body ends and the tapering portion begins, until the two screw threads disappear from the fastener, with a third screw thread being generated in a position generally midway between the positions or extensions of the two screw threads and in the portion where the main body ends and the tapering portion begins, the third screw thread gradually increasing its height and extending to a pointed forward end of the tapering portion. In this type of self-extruding fastener, the third screw thread advantageously has its outside diameter and root diameter reduced after having its lead angle increased, as it draws near the pointed forward end of the tapering portion. This third screw thread, when considered from the point upwardly, initially functions as a drilling element and serves to initiate the formation of an opening in the sheetmetal by a drilling process, removing a certain amount of the metal, after which it functions to extrude the metal surrounding the opening in the customary manner.

With the above, and other objects in view that will hereinafter appear, the nature of the invention will be more clearly understood by reference to the following detailed description, the appended claims and the several illustrated in the accompanying drawings.

FIG. 1 is a side elevation view of one embodiment of the fastener of this invention.

FIG. 3 is an enlarged fragmentary side elevational view of the fastener of FIG. 1 showing the essential portions thereof.

FIG. 10 is a fragmentary elevational view on an enlarged scale similar to FIG. 3 and shows a modified form of thread arrangement.

Figure 2:
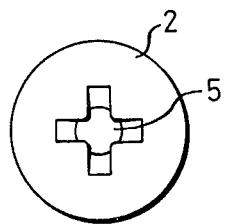
FIG. 2 is an end view of the fastener of FIG. 1 showing the configuration of the head thereof.

Referring now to the drawings in detail, it will be seen that there is illustrated in FIGS. 1 and 2 a self-threading and self-extruding fastener 10 which includes a stem 1 in the form of a main body having formed on its outer surfaces two tapping screw threads 4 and 4' of the same outside diameter, root diameter and pitch, the screw threads 4 and 4' extending essentially throughout the entire length of the stem 1. A head 2 is contiguous with the stem 1 at one end thereof and a tapering portion 3 is contiguous with the stem 1 at the end thereof opposite from the head 2. The head 2 is provided with a rotary tool engaging means 5 which in the illustrated embodiment is a groove in the form of a cross. The tapering portion 3 has its diameter gradually reduced and going towards its forward end until it terminates in a sharp point forward end 6.

As is clearly shown in FIG. 3, the two screw threads 4 and 4' have their height gradually reduced by starting at the location where the stem 1 ends and the tapering portion 3 begins until they finally disappear. A third thread 7 is generated in a position generally midway between the two screw threads 4 and 4' and extends towards the pointed forward end 6 with its height gradually increasing as it advances towards the forward end 6. However, the height of the third thread 7 is reduced as it reaches the pointed forward end 6, and the third thread 7 terminates at the pointed forward end 6, as is clearly shown in FIG. 3. Although the beginning portion of the third thread 7 is substantially parallel to the two screw threads 4 and 4', its outside diameter and root diameter are reduced and its lead angle is naturally increased as it draws near the pointed forward end 6.

In the fastener of FIGS. 1–3, the main body or stem 1 has the two screw threads 4 and 4' formed thereon while the portion of the tapering point or portion 3 at the beginning thereof has three threads including terminating portions of the two screw threads 4 and 4' and the beginning portion of the third thread 7. Only the forward end portion of the tapering portion 3 has only the third thread 7.

Figure 4:
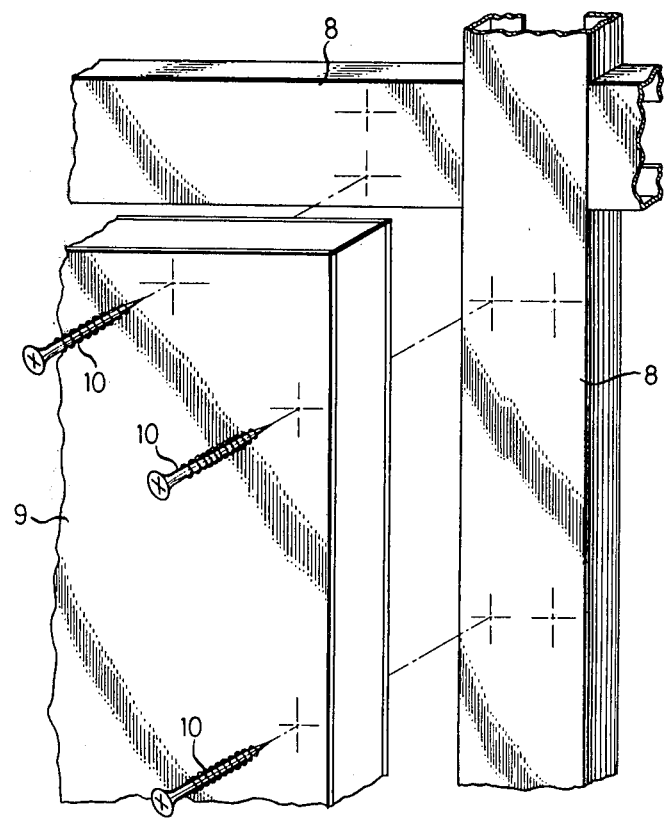
FIG. 4 is an exploded perspective view of a metal stud-plasterboard assembly showing the manner in which the fastener of FIG. 1 is used.

The functions of the self-drilling and self-extruding fastener 10 according to this invention will now be described for purposes of illustration only, but not by way of limiting the invention, with regard to an installation including a metal stud 8 made of thin sheetmetal and a plasterboard panel 9 which are fastened together in the manner shown generally in FIG. 4.

Figure 5:
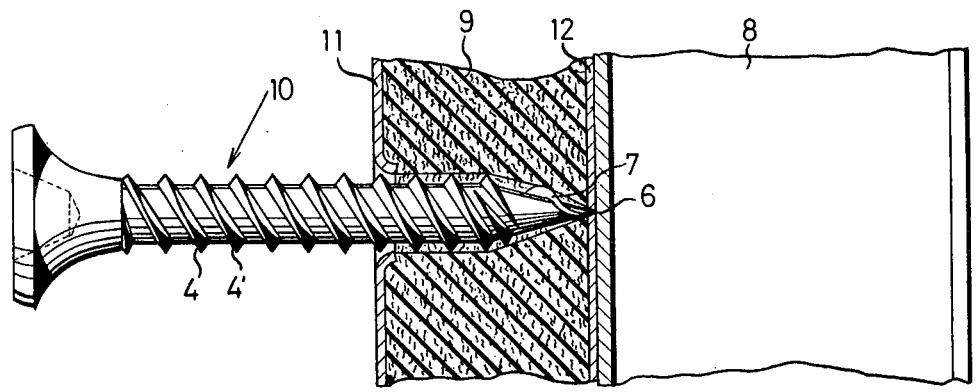
FIG. 5 is a side elevational view showing the fastener of FIG. 1 after it has penetrated the plasterboard and with the point thereof engaging the sheetmetal stud to initiate the drilling operation.

Referring to FIG. 5, the self-drilling and self-extruding fastener 10 is threadedly inserted into and through the plasterboard 9 by driving the same by means of an electric screwdriver or other type of gun, not shown. The plasterboard 9 is of a conventional construction and includes front and rear protective paper layers 11 and 12, respectively. The fastener 10 readily penetrates the plasterboard 9, the central portion of which is formed of relatively soft material, and is brought to a position shown in which the pointed forward end 6 abuts against the surface of the metal stud 8. If the fastener 10 is continued to be rotated and a forward thrust is applied thereto, the forward end 6 of the fastener 10 begins to penetrate the metal stud 8 and the portion of the third thread 7 adjacent the pointed end 6 begins to function as a drill, quickly drilling an initial opening through the sheetmetal of the stud 8 in a very short time with a minimum of thrust. It has been ascertained as results of experiments conducted that a fastener construction including a single thread which functions as a drill at its forward end best serves this purpose.

Figure 6:
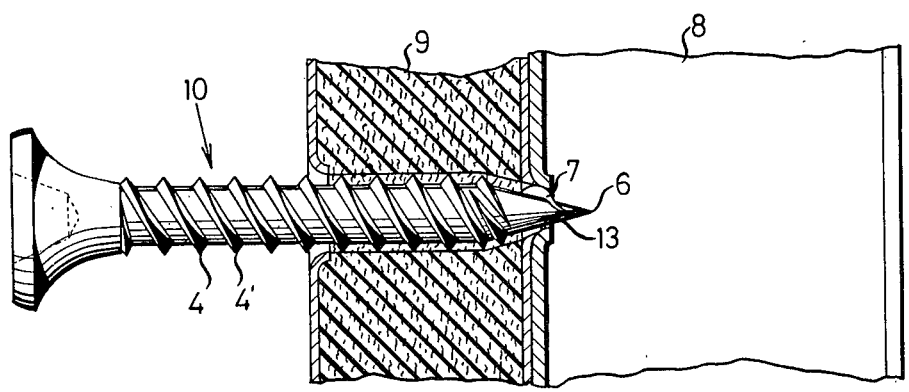
FIG. 6 is a view similar to FIG. 5 showing the stud having an opening drilled therein and the opening being expanded by extrusion of the stud metal surrounding the opening.

After the initial opening 13 has been formed by the combination of the penetration of the pointed end 6 and the drilling action of the third thread 7, the lead angle of the portion of the third thread 7 which has been forming the guide opening 13 becomes such that it discontinues the drilling operation and begins to extrude the metal of the stud surrounding the guide opening 13 so that the guide opening 13 is increased in diameter by an extruding process in a manner best shown in FIG. 6.

Figure 7:
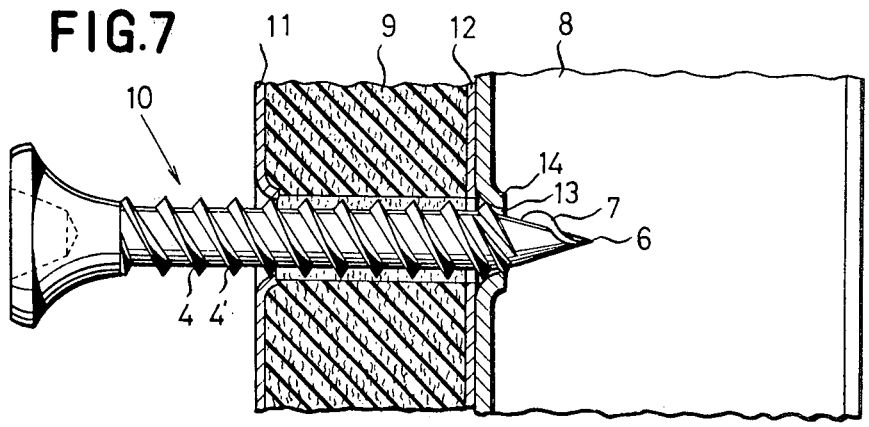
FIG. 7 is another side elevational view similar to FIG. 5 but showing the extrusion of the metal of the stud having been completed and the tapping threads having begun to engage with the extruded metal.

When the size of the guide opening 13 has grown to a suitable level, the fastener 10 forwardly extrudes the metal of the metal stud even more so into a cylindrical bore, as is clearly shown in FIG. 7. At this stage of the operation, the three thread portion of the fastener 10 in which the two screw threads 4 and 4' and the third thread 7 exist side by side, is brought into contact with the guide opening 13 in a stable manner because the fastener 10 engages the guide opening 13 at three points. This enables a uniform pressure to be applied to the circumference of the guide opening 13 with the result that a projection 14 of a suitable shape having the cylindrical bore formed therein is formed. In self-extruding fasteners, the shape, size and dimensional stability of the guide opening 13 are important factors in facilitating use of the fastener and exert great influences on the efficiency with which a fastener operation is performed and the holding force exerted by the fastener on the fastened members after the fastening operation has been completed. The fastener formed in accordance with this invention is capable of forming at all times the projection 14 of a uniform height and which has a cylindrical bore and which best serves the purpose of using the fastener of this type.

Figure 8:
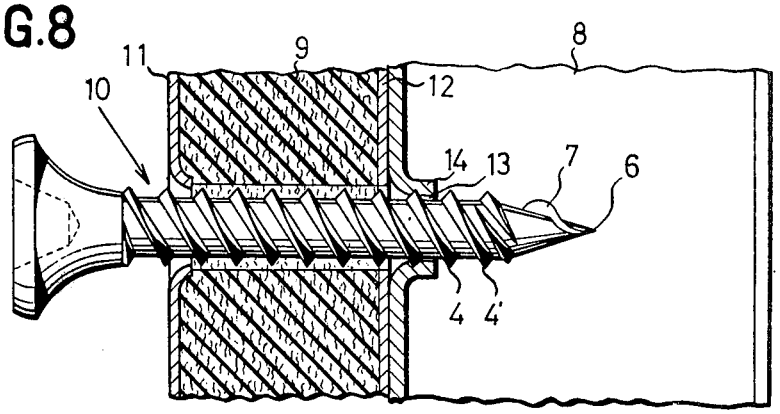
FIG. 8 is another view similar to FIG. 5 and shows the fastener partially passing through the extruded opening with the tapping threads firmly engaged therewith in a threaded relation.

The cylindrical guide bore is next cut into by the screw threads 4 and 4' so that internal threads are cut thereinto, as is best shown in FIG. 8. Thus the two screw threads 4 and 4' are self-tapping and serve to tap the cylindrical bore of the projection 14. At this time the third thread 7 has passed through the cylindrical bore and is no longer effective. On the other hand, the screw threads 4 and 4' are positively interlocked with the metal of the projection 14 and now define a screw and nut relationship.

Figure 9:
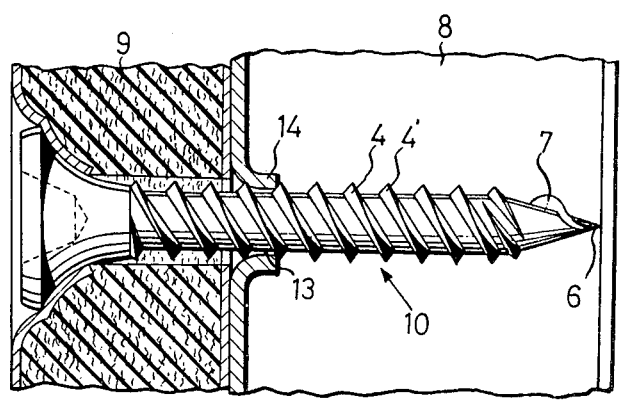
FIG. 9 is a further view similar to FIG. 5 showing the fastener in its fully seated position.

The threading of the fastener 10 through the threaded projection 14 continues until the head of the fastener is firmly seated in the plasterboard, as is shown in FIG. 9. It will thus be seen that the fastener according to the invention is constructed as such that it has a thread configuration which best serves the purpose of performing the following steps to cope with these operation stages:

(1) initial penetration of the thin sheet of metal to first form a minute guide opening followed by a drilling away of a limited amount of the sheetmetal by the large lead angle portion of the third thread;

(2) formation of the cylindrical projection having a cylindrical bore initially by an extrusion of the metal by the third thread after its lead angle decreases and finally by a combination of the three threads; and (3) formation of the internally threaded portion on the wall of the cylindrical bore and clamping of the plasterboard to the sheetmetal stud by the two screw threads.

Reference is now made to FIG. 10 wherein there is illustrated a modified form of fastener, generally identified by the numeral 20. The fastener 20 is a modification of the fastener 10 and includes a stem portion 21 corresponding to the stem 1. The stem 21 terminates at one end in a head 22 (not shown) corresponding to the head 2 and at the opposite end in a tapering portion 23 which terminates at a sharp pointed forward end 26. The stem 21 is provided with two screw threads 24 and 24'. The tapering portion 23 is provided with a third thread 27. It will be seen that the threads 24, 24' and 27 correspond to the threads 4, 4' and 7. However, it has been found that it is not necessary that the screw thread 24' continued down the tapering portion 23 as far as does the screw thread 24. It thus will be seen that the upper end of the third thread 27 terminates above the lower end of the screw thread 24 and that the lower end of the screw thread 24' terminates generally circumferentially adjacent the upper end of the thread 27.

The threads 24 and 27 function in the same manner as described above with respect to the fastener 10. It has been found, however, that the thread 24 is sufficient for the purpose of forming the cylindrical bore in the projection 14, with reference to FIG. 8, and that the initiation of the tapping action within the cylindrical bore of the projection 14 by the screw threads 24, 24' may be best staggered. It is also to be noted that it is desirable that the screw thread 24 extend further down the tapered portion 23 so that it terminates generally diametrically opposite the point where the lead angle of the thread 27 begins to approach the lead angle of the threads 24, 24'. In this manner the threads 24, 27 provide a balanced extruding action after the initial guide opening has been formed, thus the lower portion of the fastener functions as a two thread fastener and as the extruding function of the third thread 27 begins to diminish, the screw thread 24' begins to self-tap into the cylindrical bore.

With the exception of the foregoing differences, it is to be understood that the fastener 20 functions in the same manner as the fastener 10.

It is to be understood that the invention is capable of improving efficiency in performing a fastening operation and increasing the holding force exerted by the fastener after the two members have been fastened together.

In addition, the production of fasteners according to the invention involves no increase in cost as compared with fasteners of prior art because the screw threads and the third thread of the fastener can be formed in a single operation by using a pair of rolling tools in the customary manner.

Although only two preferred embodiments of the fastener have been specifically illustrated and described herein, it is to be understood that minor variations in the fastener may be made without departing from the spirit and scope of the invention as defined by the appended claims.

We claim:

1. An integral self-drilling and self-extruding screw fastener comprising,
    a cylindrical shank having at one end means for engaging a rotary driving tool and the other merging into a tapering tip ending in a point,
    the shank having formed on its outer surface a tapping screw thread of a selected outside diameter, root diameter and tapping pitch,
    said tapping screw thread continuing from the shank for a minor part of the length of the tip with its height gradually reducing just beyond the zone of merger of the shank and tip until said screw thread disappears on said tip,
    a single drilling thread generated in a position substantially within said merger zone of the shank and tip and continuing on said tip to the point,
    said drilling thread first having an extruding pitch the same as that of said tapping screw thread for a minor part of the length of the tip and gradually increasing in height and then having its height and its root diameter reduced and its lead angle greatly increased as it nears the point whereby it has a drilling pitch for a last part of the tip.

2. The screw fastener of claim 1 together with a second tapping screw thread on said shank corresponding substantially to the first mentioned tapping screw thread and terminating in overlapping relation to said drilling thread.

3. The screw fastener of claim 2 wherein said second tapping screw thread extends coextensive with said first mentioned tapping screw thread and terminates on said tapering tip in generally diametrically opposite relation to a like terminal end of said first mentioned tapping screw thread.

4. The screw fastener of claim 2 wherein said second tapping screw thread terminates on said tapering tip above a lower end of said first mentioned tapping screw thread.

5. The screw fastener of claim 2 wherein said second tapping screw thread terminates on said tapering tip above a lower end of said first mentioned tapping screw thread, and said first mentioned tapping screw thread extends at least halfway down said tapering tip.

6. The screw fastener of claim 1 wherein said drilling thread is axially offset relative to said tapping thread and has a maximum outside diameter less than that of adjacent portions of said tapping screw thread.

7. The screw fastener of claim 2 wherein said drilling thread is axially offset relative to said first mentioned tapping thread and has a maximum outside diameter less than that of adjacent portions of said first mentioned tapping screw thread.

8. An integral self-extruding screw, comprising,
    a cylindrical shank having at one end means for engaging a rotary driving tool and the other end merging through a merger zone into a substantially straight tapering tip ending in a point,
    the shank having formed on its outer surface a pair of spaced apart tapping screw threads of a selected outside diameter, root diameter and tapping pitch,
    each of said tapping screw threads continuing from the shank to at least said merger zone with its height gradually reducing until said screw thread disappears,
    a single opening forming and enlarging thread generated on said tip between said tapping threads at least close to said merger zone and continuing on said tip to the point to form a single thread zone,
    said opening forming and enlarging thread first having a tapping pitch the same as that of said tapping threads for a minor part of the length of the tip and then gradually increasing in height and then having its height and its root diameter reduced and its lead angle increased as it nears the point whereby it has an opening enlarging pitch for a substantial part of the length of the tip,
    said opening forming and enlarging thread being axially offset relative to said tapping threads and axially overlapping at least one of said tapping threads,
    said single thread zone together with said tip point defining means for forming a guide opening in sheet metal, said zone in which the opening and forming thread overlaps at least one of the tapping threads forming means for extruding sheet metal to form an extruded cylindrical bore, and said two thread zone forming means for internally threading a just previously formed extruded cylindrical bore.

9. An integral self-extruding screw, as defined in claim 8, in which
    one of said tapping threads terminates on the tip close to said merger zone and the other tapping thread continues through a major part of the length of the tip.

* * * * *